(12) United States Patent
Ludewig et al.

(10) Patent No.: US 7,788,432 B2
(45) Date of Patent: Aug. 31, 2010

(54) SYSTEM FOR PERFORMING A SERIAL COMMUNICATION BETWEEN A CENTRAL CONTROL BLOCK AND SATELLITE COMPONENTS

(75) Inventors: Ralf Ludewig, Schoenaich (DE); Thuyen Le, Taufkirchen (DE); Tobias Webel, Schwaebisch-Gmuend (DE); Klaus Peter Gungl, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 12/244,430

(22) Filed: Oct. 2, 2008

(65) Prior Publication Data

US 2009/0113094 A1    Apr. 30, 2009

(30) Foreign Application Priority Data

Oct. 26, 2007    (EP) .................................. 07119371

(51) Int. Cl.
*G06F 13/00*    (2006.01)
(52) U.S. Cl. ...................... 710/110; 710/105; 710/107; 710/305

(58) Field of Classification Search .................. 710/100, 710/105, 107, 305
See application file for complete search history.

(56) References Cited

U.S. PATENT DOCUMENTS

| 5,124,990 | A  | * | 6/1992 | Williamson ................. 714/717 |
| 5,452,419 | A  | * | 9/1995 | Di Giulio et al. ............ 709/200 |
| 6,529,979 | B1 | * | 3/2003 | Floyd et al. ................. 710/105 |
| 6,957,115 | B1 | * | 10/2005 | Meyer-Grafe et al. ....... 700/108 |
| 2008/0126636 | A1 | * | 5/2008 | Lehzen ....................... 710/105 |

* cited by examiner

*Primary Examiner*—Glenn A Auve
(74) *Attorney, Agent, or Firm*—Jason O. Piché

(57) ABSTRACT

The various embodiments described herein relate to a system for performing a serial communication between a central control block and a plurality of satellite components within a semiconductor chip. The system comprises at least one logical ring that serially connects the satellite components to the central control block. The system further comprises a centralized timer. The satellite components aid the system in obeying protocols and performing direct accesses to and/or from registers. The logical ring comprises at least one data channel that is provided for transmitting data packets and address packets. Single-envelope transactions are implemented. Errors of the satellite components associated with the single-envelope transactions are reported to the central control block as additional acknowledgement information.

16 Claims, 3 Drawing Sheets

US 7,788,432 B2

SYSTEM FOR PERFORMING A SERIAL COMMUNICATION BETWEEN A CENTRAL CONTROL BLOCK AND SATELLITE COMPONENTS

CROSS REFERENCE TO RELATED APPLICATION

This application claims priority to German patent application number 07119371.8, filed on Oct. 26, 2007, in accordance with 35 U.S.C. 119, which is incorporated by reference herein in its entirety.

BACKGROUND OF THE INVENTION

1. Field of the Invention

The various embodiments described herein relate to a system for performing a serial communication between a central control block and satellite components according to the appended claims.

2. Description of the Related Art

A microprocessor chip comprises various parts that must be configured or monitored during a power-on-reset (POR) procedure or even while the microprocessor chip is running.

A general structure implements a central control block that connects to distributed satellite components in a ring fashion to minimize routing overhead. The satellite components aid such a structure in obeying protocols and performing direct accesses to or from registers.

An access to the central control block can be requested from one or several internal masters and external masters. The internal masters are arranged within the chip. The external masters are arranged outside of the chip. Typical examples of internal masters include the POR engine or the processor core itself. A service processor acting as an external master accesses the central control block via protocols such as JTAG (Joint Test Action Group), I2C (Inter-Integrated Circuit), or proprietary protocols.

U.S. Pat. No. 6,529,979 describes a method and an apparatus for transferring data using an on-chip bus. A data transaction consists of an address packet and a data packet. The address packet and the data packet are transmitted on the on-chip bus. The on-chip bus is a two-wire serial bus consisting of an address line and a data line. The on-chip bus connects a plurality of satellite components in a daisy-chain fashion to a central source. Each satellite component on the chip is associated with a unique identifier. In response to a determination that the data transaction is accepted by the satellite component, the address packet is modified to indicate the acceptance of the address packet and the data packet. The acceptance is determined by the address in the address packet positively comparing to the unique identifier for the satellite component.

In this prior art a satellite component may experience a write error or a read error. For example, this may occur in a hang situation. Such a hang situation is detected by implementing a timer in each satellite component. In the event of a hang situation, a satellite component reports an error to another logic part of the processor (such logic part is outside of the scope of the various embodiments described herein). However, it is not possible to relate the reported error to the register access causing the error if the central source has carried out other register accesses in the meantime.

OBJECT OF THE INVENTION

It is an object of the various embodiments described herein to provide an improved system for performing a serial communication between a central control block and satellite components.

SUMMARY OF THE INVENTION

This object is achieved by a system as provided in the independent claims. Further exemplary embodiments are described in the dependent claims and are taught in the description below.

The various embodiments described herein relate to a system for performing a serial communication between a central control block and a plurality of satellite components within a semiconductor chip. The system may comprise at least one logical ring that serially connects the satellite components to the central control block. The system may further comprise a centralized timer that may be implemented within the system. The satellite components may aid the system in obeying protocols and performing direct accesses to and/or from registers. The logical ring may comprise at least one data channel. The data channel may be formed as a serial ring and may be provided for transmitting data packets and address packets. The data channel transactions may have both an address phase, during which address information is presented on the bus, and a data phase, during which data information is presented on the bus.

In addition, single-envelope transactions may be implemented, wherein any data phase may be coordinated with a corresponding address phase so that the satellite components acknowledge the transaction only after a successful access to a register is performed. In the event of a read error or a write error, such single-envelope transactions may enable the direct relation of the error to the transaction without the need to introduce an additional ring. Satellite errors associated with such single-envelope transactions may be reported as additional acknowledgment information to the central control block rather than to another logic part of the processor. Such reporting of satellite errors as a part of the transaction information simplifies the error reporting structure.

In an exemplary embodiment, the data channel may be formed as a serial bus. In particular, the data channel may be formed as a one-wire serial bus.

In another exemplary embodiment, the logical ring may include a control channel formed as a serial ring. The control channel may be formed as a serial bus. In particular, the control channel may be formed as a one-wire serial bus. Moreover, the control channel may be provided for power gating the satellite components (i.e., turning on and/or off a power gate of the satellite components). Furthermore, the control channel may be provided for turning on and/or off a local clock. In addition, the control channel may be provided for resetting the system. Additionally, the control channel may be provided for checking the functionality of the serial ring.

In another exemplary embodiment, the centralized timer of the system may be implemented within the central control block. The centralized timer reduces the complexity of the satellite components.

In another exemplary embodiment, the central control block may serve one or more logical rings (i.e., logical ring(s)). The selection of the logical ring(s) to be used may depend on additional information which is not sent over the logical ring(s).

The system according to the various embodiments described herein is advantageous in that a dedicated ring for the control channel provides an easy and fast way to turn on the clock and to check for the functionality of the ring. In the prior art, these activities are performed by using the incoming address packet or data packet, which means that the central control block must shift lengthy information before recognizing that the ring is corrupted.

BRIEF DESCRIPTION OF THE DRAWINGS

The aforementioned disclosure, as well as additional objectives, features, and advantages of the various embodiments described herein, will be further explained in the following detailed written description.

The novel and inventive features of the various embodiments described herein are set forth in the appended claims. The embodiments and advantages thereof will be best understood by reference to the following detailed description of exemplary embodiments in conjunction with the accompanied drawings, wherein:

DETAILED DESCRIPTION

Figure 1:
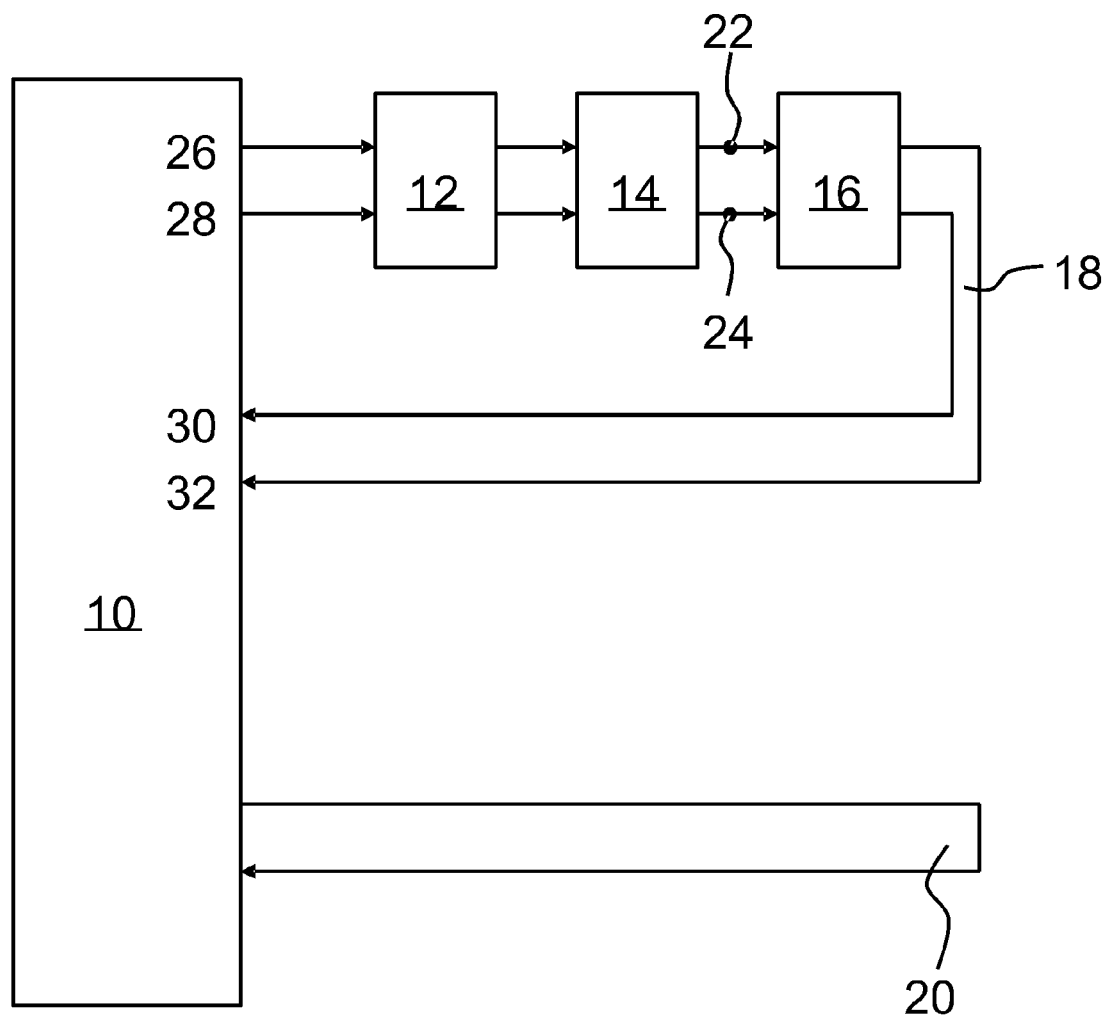
FIG. 1 illustrates a schematic diagram of a system for performing a serial communication between a central control block and satellite components according to an exemplary embodiment.

FIG. 1 illustrates a schematic diagram of a system for performing a serial communication between a central control block 10 and a plurality of satellite components 12, 14 and 16 according to an exemplary embodiment.

In this embodiment, the system includes the three satellite components 12, 14 and 16 connected to the central control block 10 by a logical ring 18. The central control block 10 is connected to the satellite components 12, 14 and 16 in a ring fashion. In FIG. 1 a logical ring 20 is also shown. Generally, an exemplary embodiment may comprise one or more logical rings.

The logical ring 18 may comprise two physical serial rings, namely a data channel 22 and a control channel 24. The data channel 22 may be formed as a one-wire serial bus. The control channel 24 also may be formed as a one-wire serial bus. From the perspective of the central control block 10, an outbound direction of the data channel 22 is called a downlink data channel 26, and an inbound direction of the data channel 22 is called an uplink data channel 32. Similarly, from the perspective of the central control block 10, an outbound direction of the control channel 24 is called a downlink control channel 28, and an inbound direction of the control channel 24 is called an uplink control channel 30.

The central control block 10 may provide a terminal for each of the downlink data channel 26, the downlink control channel 28, the uplink control channel 30, and the uplink data channel 32, respectively.

Figure 2:
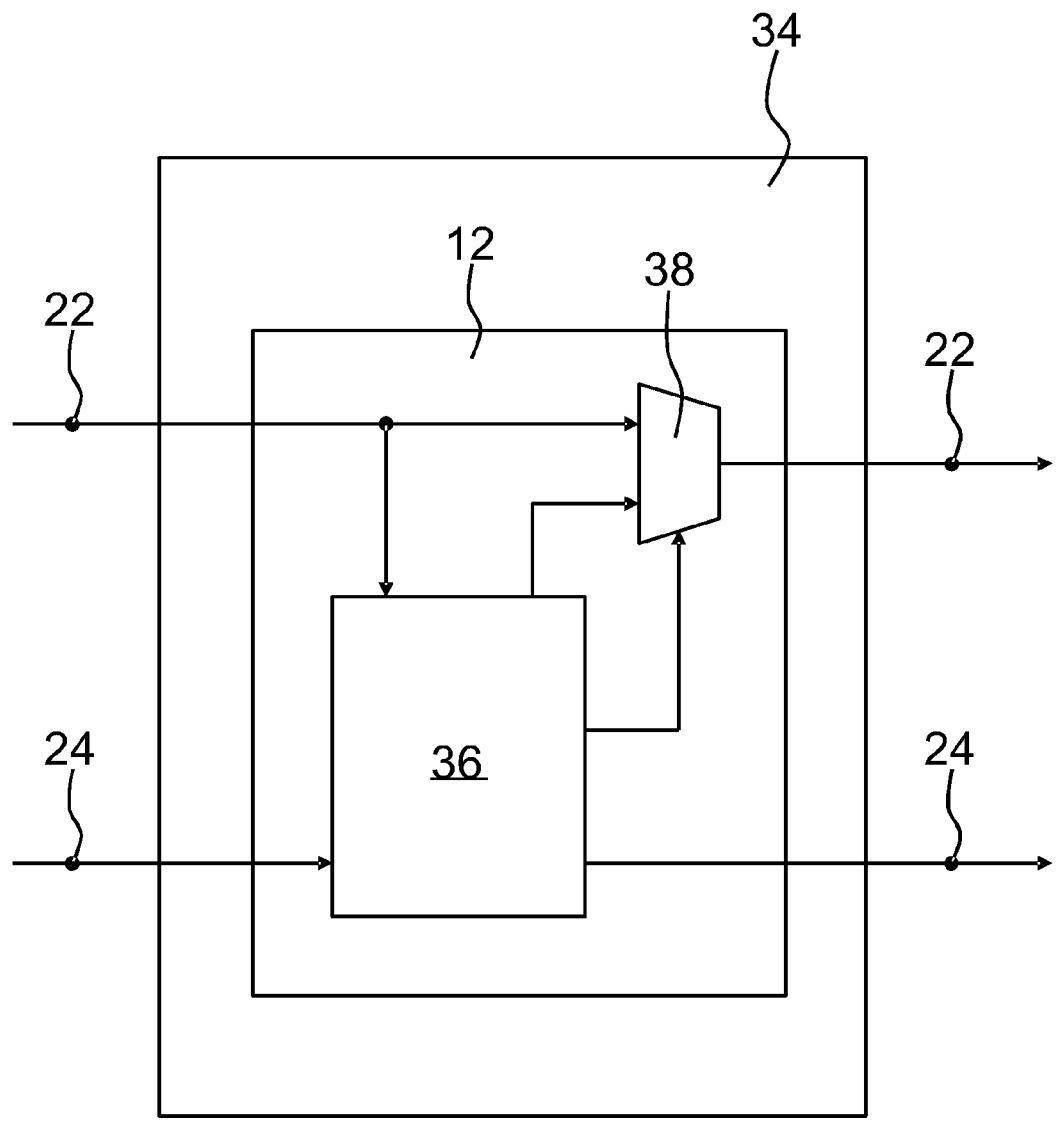
FIG. 2 illustrates a detailed schematic diagram of the satellite component embedded into a macro circuit according to an exemplary embodiment.

FIG. 2 illustrates a detailed schematic diagram of the satellite component 12, 14, 16 according to an exemplary embodiment. Each satellite component 12, 14, 16 may be embedded within a macro circuit 34 that implements the relevant registers and other logic. Each satellite component 12, 14, 16 may comprise a kernel 36 and a logical gate 38. The kernel 36 may be interconnected into the control channel 24. The logical gate 38 may be interconnected into the data channel 22.

Figure 3:
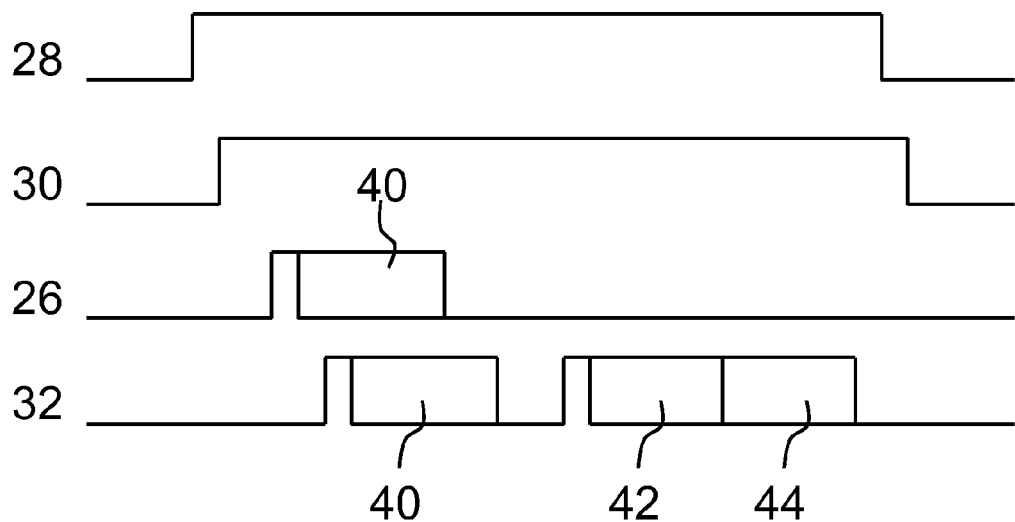
FIG. 3 illustrates a schematic timing diagram of the protocol for performing a read access according to an exemplary embodiment.

FIG. 3 illustrates a schematic timing diagram of the protocol for performing a read access according to an exemplary embodiment. The signals on the downlink data channel 26, the downlink control channel 28, the uplink control channel 30, and the uplink data channel 32 between the central control block 10 and the logical ring 18 are shown. Prior to the transaction, the central control block 10 may set the downlink control channel 28 to logical "one" in order to turn on the clock signal of the satellite components 12, 14 and 16. The clock signals of the satellite components 12, 14 and 16 are not explicitly shown in FIG. 3.

If all of the satellite components 12, 14 and 16 are operating properly, the uplink control channel 30 may be asserted after a number of delay cycles that depends on the implementation. The delay may be approximately one cycle per satellite component 12, 14, 16.

Once the uplink control channel 30 is asserted, the central control block 10 may send via the downlink data channel 26 an address packet 40, depicted in FIG. 3 as an enclosed region on the downlink data channel 26. The address packet 40 may contain additional bits to protect the integrity of the address packet 40. Practically, the first bit of the address packet 40 may be a start bit of logical "one". The sent address packet 40 on the downlink data channel 26 appears as an echoed version of the signal on the uplink data channel 32 if the logical ring 18 and all of the satellite components 12, 14 and 16 are working properly. Whenever the satellite component 12, 14, 16 has the desired data, it may send one or more reply packets (i.e., reply packet(s)) back to the central control block 10 via the uplink data channel 32.

The reply packet(s) may include an address packet 40, an acknowledgement information packet 42, and a data packet 44. These packets are depicted in FIG. 3 as enclosed regions on the uplink data channel 32.

Both the acknowledgement information packet 42 and the data packet 44 may contain additional bits to protect the integrity of the information. After receiving the reply packet (s) via the uplink data channel 32, the central control block 10 may desert the downlink control channel 28. The falling edge of the signal on the downlink control channel 28 may be used to reset all of the satellite components 12, 14 and 16 to a well-defined idle state.

Figure 4:
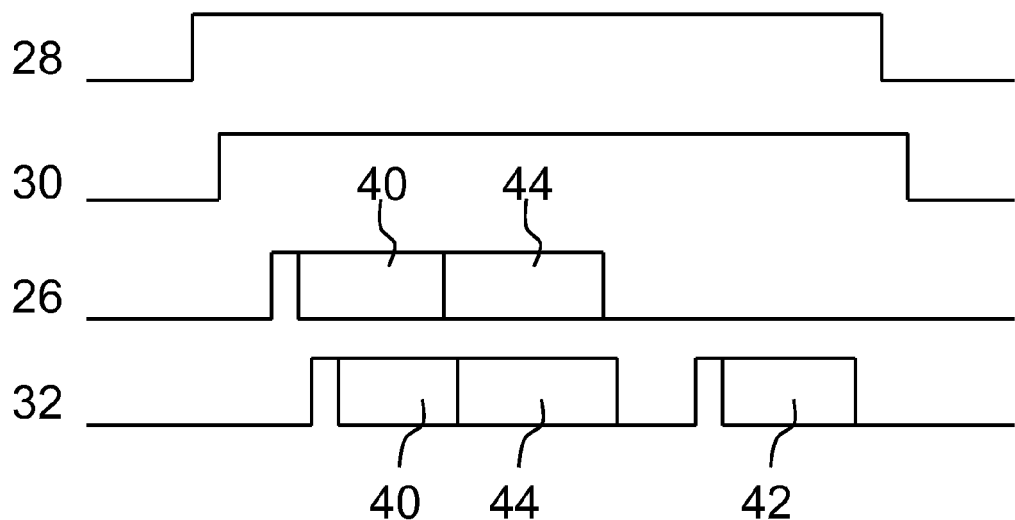
FIG. 4 illustrates a schematic timing diagram of the protocol for performing a write access according to an exemplary embodiment.

FIG. 4 illustrates a schematic timing diagram of the protocol for performing a write access according to an exemplary embodiment. It is similar to the read access protocol, except that the central control block 10 may send via the downlink data channel 26 both the address packet 40 and the data packet 44. On the uplink data channel 32, the satellite component 12, 14, 16 may send one or more reply packets back to the central control block 10. Specifically, the satellite component 12, 14, 16 may mirror back to the central control block 10 the address packet 40 and the data packet 44 and then may send the acknowledgement information packet 42, which may be protected by additional bits.

With respect to both a read access and a write access, the address packet 40 on the downlink data channel 26 may contain information about the unique identity of the satellite component 12, 14, 16, the unique identity of the register address and information about a read or a write, and (optionally) one or more additional bits to protect the integrity of the address packet 40.

Moreover, the address packet 40 on the uplink data channel 32 may contain information about the unique identity of the satellite component 12, 14, 16, the unique identity of the register address, one or more acknowledgement information bits, and (optionally) one or more additional bits to protect the integrity of the address part.

All errors associated with a pending register access may be reported by the satellite component 12, 14, 16 to the central control block 10 through the use of one or more acknowledgement information bits in the reply packet(s) on the uplink data channel 32 (e.g., in the address packet 40).

The data packet 44 may contain data bits and may also contain one or more additional bits to protect the integrity of the data part.

In an exemplary embodiment, all physical wires carrying the downlink data channel 26, the downlink control channel 28, the uplink control channel 30, and the uplink data channel 32 may stay at a predefined logic level in the idle state.

Each packet on the downlink data channel 26 and the uplink data channel 32 may contain one or more start bits to enable detection of the packet. Additionally, each packet on the downlink data channel 26 and the uplink data channel 32 may have a constant and predetermined packet length to simplify the receiver logic implementation.

Each packet on the downlink data channel 26 and the uplink data channel 32 may contain at its end one or more frame bits to specify the end of the packet and to detect stuck-at-faults on the wires.

Furthermore, the rising edge of the signal on the downlink control channel 28 may turn on the local clock of the satellite components 12, 14 and 16 and optionally may power-on the satellite components 12, 14 and 16 if power gating has been implemented.

The falling edge of the signal on the downlink control channel 28 may reset the satellites to a well-defined state, may turn off the local clock, and optionally may power-off the satellite components 12, 14 and 16 if power gating has been implemented.

A hang detection is performed only in the central control block 10 by a central timer. If a hang situation is detected, the central control block 10 may reset the downlink control channel 28 to logical "zero" in order to terminate the transaction and may reset the satellite components 12, 14 and 16 as described above.

The various exemplary embodiments described herein may be realized in hardware, in software, or in a combination of hardware and software. The various embodiments may be embedded in a computer program product that comprises all the features enabling the implementation of the embodiments described herein. Further, when loaded in a computer system, the computer program product is able to carry out the embodiments.

Although various embodiments have been described herein with reference to the accompanying drawings, it is to be understood that the disclosure is not limited to the precise embodiments described and that various other changes and modifications may be performed therein by one skilled in the art without departing from the scope or spirit of the disclosure. All such changes and modifications are intended to be included within the scope of the disclosure as defined by the appended claims.

The invention claimed is:

1. A system for performing a serial communication between a central control block and a plurality of satellite components within a semiconductor chip, the system comprising:
    at least one physical logical ring that serially connects the satellite components to the central control block, the at least one logical ring comprising at least one data channel provided for transmitting data packets and address packets; and
    a centralized timer;
    wherein the satellite components cooperate with the system for obeying protocols and performing direct accesses to or from registers, wherein single-envelope transactions are implemented, and wherein errors of the satellite components associated with the single-envelope transactions are reported to the central control block as additional acknowledgement information.

2. The system according to claim 1, wherein the data channel is formed as a serial bus.

3. The system according to claim 1, wherein the data channel is formed as a one-wire serial bus.

4. The system according to claim 1, wherein the logical ring includes a control channel.

5. The system according to claim 4, wherein the control channel is formed as a serial bus.

6. The system according to claim 4, wherein the control channel is formed as a one-wire serial bus.

7. The system according to claim 4, wherein the control channel is provided for turning on or off a local clock.

8. The system according to claim 4, wherein the control channel is provided for turning on or off a power gate of the satellite components.

9. The system according to claim 4, wherein the control channel is provided for resetting the system.

10. The system according to claim 4, wherein the control channel is provided for checking the functionality of the logical ring.

11. The system according to claim 1, wherein the centralized timer is implemented within the central control block.

12. The system according to claim 1, wherein the central control block is provided for serving one or more logical rings.

13. The system according to claim 1, wherein a selection of one or more logical rings from several logical rings depends on additional information from outside of the several logical rings.

14. The system according claim 1, wherein the system is realized in hardware.

15. The system according to claim 1, wherein the system is realized in a combination of hardware and software.

16. A computer program product stored on a computer-usable medium, comprising a computer-readable program causing a computer to implement the system according to claim 1.

* * * * *